(12) United States Patent
Pollack

(10) Patent No.: US 9,239,122 B2
(45) Date of Patent: Jan. 19, 2016

(54) PIPE CONNECTION

(71) Applicant: Single Buoy Moorings, Inc. (Switzerland Corporation), Marly (CH)

(72) Inventor: Jack Pollack, Houston, TX (US)

(73) Assignee: Single Buoy Moorings, Inc., Marly (CH)

( * ) Notice: Subject to any disclaimer, the term of this patent is extended or adjusted under 35 U.S.C. 154(b) by 0 days.

(21) Appl. No.: 13/857,783

(22) Filed: Apr. 5, 2013

(65) Prior Publication Data

US 2014/0300104 A1    Oct. 9, 2014

Related U.S. Application Data

(60) Provisional application No. 61/650,292, filed on May 22, 2012.

(51) Int. Cl.
  *F16L 15/08*    (2006.01)
  *F16L 15/00*    (2006.01)

(52) U.S. Cl.
  CPC ............... *F16L 15/00* (2013.01); *F16L 15/004* (2013.01)

(58) Field of Classification Search
  USPC ................................................. 285/333, 334
  See application file for complete search history.

(56) References Cited

U.S. PATENT DOCUMENTS

| | | |
|---|---|---|
| 1,799,941 A | 4/1931 | Wulle |
| 2,631,871 A | 3/1953 | Stone |
| 2,653,294 A | 9/1953 | McMillan |
| 3,167,333 A | 1/1965 | Hall et al. |
| 3,842,878 A | 10/1974 | Duer |
| 3,879,071 A | 4/1975 | Gockler |
| 4,568,113 A | 2/1986 | Axford et al. |
| 4,629,221 A | 12/1986 | Lumsden et al. |
| 4,676,529 A | 6/1987 | McDonald |
| 4,706,997 A | 11/1987 | Carternsen |
| 5,066,052 A * | 11/1991 | Read .............................. 285/334 |
| 5,492,375 A | 2/1996 | Smith |
| 5,505,502 A | 4/1996 | Smith et al. |
| 5,681,059 A * | 10/1997 | Mackie ......................... 285/334 |
| 5,785,357 A | 7/1998 | Foster et al. |
| 5,810,401 A | 9/1998 | Mosing et al. |
| 5,954,374 A * | 9/1999 | Gallagher et al. ............ 285/334 |
| 5,964,486 A | 10/1999 | Sinclair |
| 6,047,997 A | 4/2000 | Olivier |
| 6,056,324 A * | 5/2000 | Reimert et al. ............... 285/334 |
| 6,120,067 A * | 9/2000 | Mosing et al. ............... 285/333 |
| 6,176,524 B1 | 1/2001 | Tsuru et al. |
| 6,485,061 B1 * | 11/2002 | Mosing et al. ............... 285/333 |
| 6,494,499 B1 * | 12/2002 | Galle et al. ................... 285/334 |
| 6,755,447 B2 | 6/2004 | Galle, Jr. et al. |
| 7,384,075 B2 * | 6/2008 | Ress, Jr. ........................ 285/333 |
| 7,588,270 B2 * | 9/2009 | Durand et al. ................ 285/333 |
| 8,011,698 B2 * | 9/2011 | Verger et al. ................. 285/333 |
| 8,056,940 B2 * | 11/2011 | Morgan et al. ............... 285/333 |
| 2003/0075924 A1 | 4/2003 | Olivier |
| 2003/0155768 A1 | 8/2003 | Hollingsworth et al. |
| 2010/0032166 A1 | 2/2010 | Slack |
| 2011/0227338 A1 | 9/2011 | Pollack et al. |

FOREIGN PATENT DOCUMENTS

| | | |
|---|---|---|
| EP | WO 2009/000851 A1 | 12/2008 |
| WO | WO2011119256 | 9/2011 |

* cited by examiner

*Primary Examiner* — David E Bochna
(74) *Attorney, Agent, or Firm* — Blank Rome LLP

(57) ABSTRACT

A pipeline includes a pair of pipe sections with ends (20, 22), connected together by threads. the pipe ends having axial and radial abutments lying beyond the ends of the thread. The abutments are located to stabilize a nib sealing arrangement and to enhance the capacity to resist bending while using a shorter thread length. The shorter threads (24, 26) enable pipe ends of smaller wall thicknesses to be used. At the abutments, each pipe end has a nib (40A, 40B) that is deflected to enter a groove as the pipe ends mate.

2 Claims, 2 Drawing Sheets

PIPE CONNECTION

CROSS-REFERENCE

Applicant claims priority from U.S. provisional patent application Ser. No. 61/850,292 filed May 22, 2012.

BACKGROUND OF THE INVENTION

Pipelines are commonly constructed by connecting together pipe sections, each of about 40 feet length, by turning one pipe section to connect its tapered thread to a tapered thread of the other pipe section. It is well known in thread design that most of the loads applied to the threads are applied over the first few threads. Beyond the opposite ends of the threads, the pipe sections are sealed together by abutments where axially-facing surfaces or radially-facing surfaces of the pipe sections abut each other to help seal the pipe joint. Further sealing is obtained by forming each pipe end with a nib that projects beyond the axial facing abutment and into a groove formed in the other pipe section. To obtain good sealing, the nibs have to fit very closely into the grooves. A strong pipeline with mating pipe sections of small wall thickness, and with good sealing at the pipe section ends, would be of value.

SUMMARY OF THE INVENTION

In accordance with one embodiment of the invention, pipe sections are provided for threadable connection, which are of small wall thickness, which have high axial and bending resistance, and which provide good fluid sealing. The pipe sections each have a thread of small axial length with long gaps between the thread ends and the abutments at the ends of the pipe sections.

The pipe sections are sealed together by nibs that are each formed at the end of one pipe section and that lie in a groove formed at the end of the mating pipe section. Each nib extends 360° about a circle, and each groove extends in a circle, about the pipe axis. For good sealing, the nibs fit with an interference fit into the grooves. Each nib is sequentially deflected into alignment with a groove by a tapered pipe internal wall leading to a radial abutment surface, so as the pipe sections become fully mated, the radial interference abutments deflect the nibs and grooves into accurate alignment.

The novel feature of the invention are set forth with particularity in the appended claims. The invention will be best understood from the following description when read in conjunction with the accompanying drawings.

DESCRIPTION OF THE PREFERRED EMBODIMENTS

Figure 1:
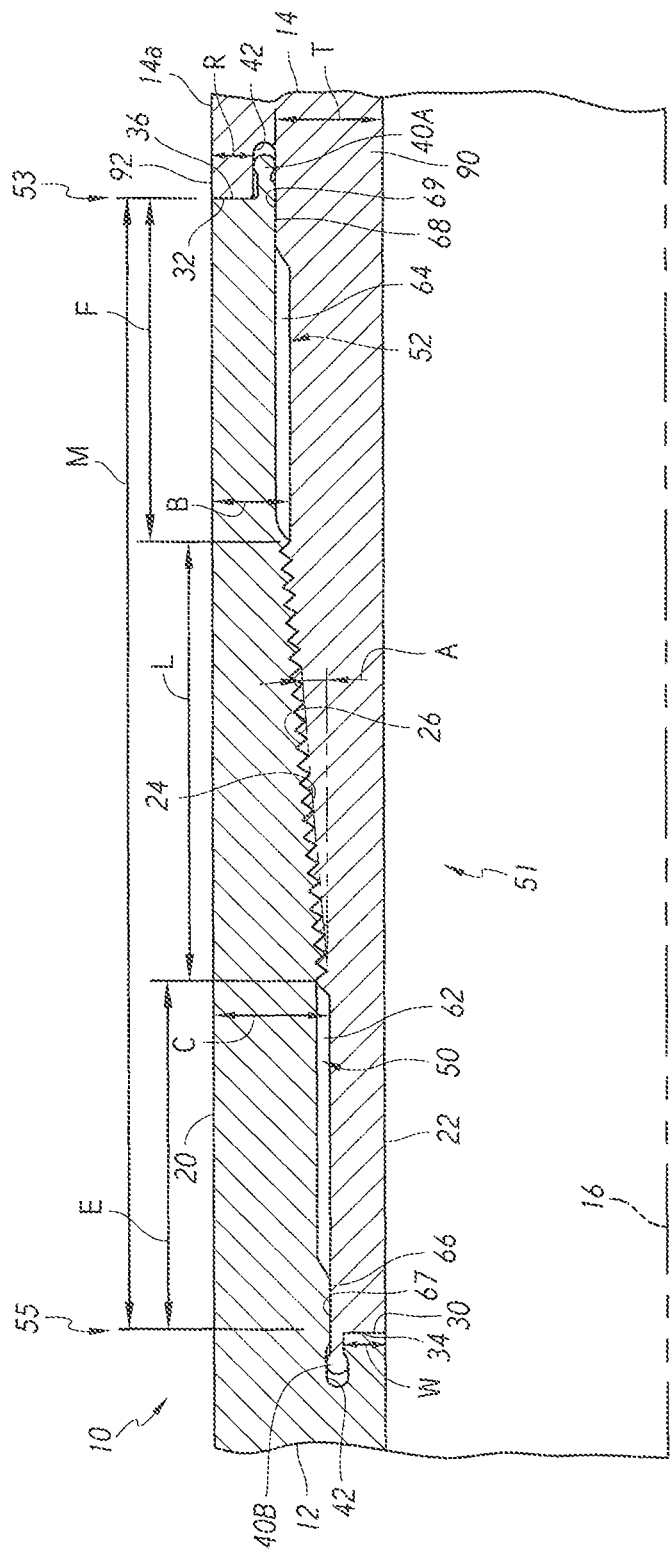
FIG. 1 is a sectional side view of the mated end portions of pipe sections of a pipeline, showing only one side of the cross-section as taken along the pipeline axle.

FIG. 1 shows a pipe line 10 that includes two pipe sections 12, 14 having pipe ends 20, 22 that are fully mated in a pipe connection 51. The pipe ends include a radially outer (with respect to pipe axis 16) pipe end, or box 20, and a radially inner pipe end, or pin 22, that are connected in series along the pipeline axis 16. The pipe sections have short pipe threads 24, 26 of conical (tapered) shape. A common NPT (national tapered thread) thread has a taper angle A of about 3° (1.6° to 4°).

The mated ends of each pipe section have abutments where radial and axial surfaces of two pipe ends abut. FIG. 1 shows axial-facing, or axial abutments 32, 36 near the outside, and axial abutments 34, 30 near the inside of the pipe sections. The pair of pipe ends are mated by forcing one pipe section's threads to load the threads of that pipe section into the threads of the other mating pipe section, as by turning one pipe section, so the axial faces at abutments 32, 36 and 30, 34 are forced to abut one another. The pipe connection 51 has opposite ends 63, 55 at the axially-facing abutments such as 32, 36.

Each pipe section also has nibs 40A, 40B (small pipe projections that include surface 68) that have ends that fit into grooves 42, to seal against the leakage of fluids. The nib 40A lies at the right side of FIG. 1, where the pipeline radially outer side is of smallest thickness R. The nib 40B lies at the left side of FIG. 1, where the pipeline radially inner side is of smallest thickness W. Each nib extends in a circle by 360° around the axis 16 and seals against the 360° walls of the groove. Radially-facing radial interference shoulders such as 68, 69 and 66, 67, which lie adjacent to the nib-in-grooves, both align and stabilize these interfering nib surfaces and also help each end of a pipe section to take loads in bending of the pipeline, to increase the strength in bending without significant axial loading of the threads. The radially-facing shoulders 66-67, 68-69 are each cylindrical and extend 360° about the pipe axis.

A long axial distance M between the axially-facing abutments such as 32, 36 and 30, 34 is desirable to resist bending of the pipe line and to improve the axial abutment. The longer distance M improves resistance to bending as it provides a longer moment arm for the radial abutments (68, 69 and 66, 67) in pipe sections 12, 14, which enhances the pipe bending resistance. The axial abutment is improved as the longer distance M increases the distance E and F between the ends of the threads and the axial abutments. This longer distance allows for slight imperfections in the dimensions E, F of the pipe ends to minimize the effect on the variation of the desired axial abutment load. This axial abutment load variation is improved by longer E and F dimensions as the opposing E and F dimensions in the pin and box go into tension and compression when achieving the axial abutment load. The E and F sections are like springs defined by their cross-sectional area, elastic modulus and length. The longer the length, the better these "springs" adjust to any axial imperfection in their length dimensions. By having longer lengths it is thus easier to obtain at least some minimum of the desired interference with reasonable machining tolerances.

The threads 24, 26 that connect the pipe section ends, are each of a short length L compared to the length M between the axial abutment surfaces. Axially-elongated spaces 50, 52 of lengths E and F are left between each end of a thread and an adjacent abutment at the connection end. Each axially-elongated space E and F includes a wide gap part 62, 64 between the inner and outer pipe sections, and also includes interference shoulders at 66, 67 and 68, 69 which form radially-facing abutments. The lengths E and F are each at least 25% of the length M between abutments at opposite ends of the connection.

The use of connecting threads 24, 26 of short length (in a direction parallel to the pipeline axis 16) has the advantage that it results in pipe section walls of small radial thickness. Along the tapered thread length L, the thickness grows from the thickness at B to the thickness at C. The increase in thickness (C-B) equals the sine of the thread taper angle A such as 3°, times the thread length L. In one example, the minimum outer pipe wall thickness B is 0.5 inch, and the thread length L is 6 inches. The sine of 3° (0.05) times 6 inches is 0.3 inch. Therefore, the pipe wall thickness grows by 0.3 inch along the thread length L. If the threads 24, 26 each extended the full length of the distance M, which is 2.6 times the short thread length L then the wall thickness would increase by 0.8 inch instead of 0.3 inch. A decrease in maximum wall thickness of 0.5 inch, from 1.3 inches to 0.8 inch, saves considerable cost by reducing the amount of steel to be used and the weight of the pipe to be supported.

Applicant prefers to use threads 24, 26 of a length L no more than 60%, and preferably no more than 50%, of the distance M. The distance M is the distance between axial abutments such as 30, 34 and 32, 36 of the pipe connection 51.

FIGS. 2-5 show how applicant installs a nib 40A of one pipe section end into a groove 42 of another pipe section end. After installation there is a radial interference fit between the nib and groove walls that is preferably 0.002 to 0.008 inch (50 to 200 microns), between the uncompressed thickness D of each nib such as 40A and the radial width G of the groove such as 42. The interference fit results in a metal-to-metal fluid seal.

The make-up of these pipe sections depends on the type of thread used, in a first procedure, a tapered helical thread at 24 (FIG. 1), threadably engages another thread at 26 when one pipe end is turned into the other. In a second procedure there are tapered concentric threads that are engaged by axially forcing the threads over one another into a predetermined fit. U.S. Pat. No. 5,954,374 by Gallagher, et al. and U.S. Pat. No. 5,964,486 by Sinclair show such concentric threads. When using tapered helical threads, the sections come together moving one end in the direction J (FIG. 2) until the threads 24, 26 engage. In this arrangement the nib 40A is positioned to clear interference surface 69. As shown in FIG. 3, the turning of the threads forces taper 73 against taper 72 to start to deflect the nib walls. This causes interference surfaces 68, 69 and 66, 67 (FIG. 1) to slide on one another at ends of the pipe sections. Further sliding of the nib in the direction J (FIG. 4) moves the nib 40A along an interfering taper 75. This interference causes the pipe end 22 to move radially inward (toward the pipeline axis) and the pipe end 20 to expand radially, thereby bringing the nib 40A and groove 42 at opposing sides into alignment for a proper entry. The turning continues and forces the nibs into grooves 42 until the axial abutments 32, 36 (FIG. 4) and 34, 30 (FIG. 1) abut one another.

Figure 2:
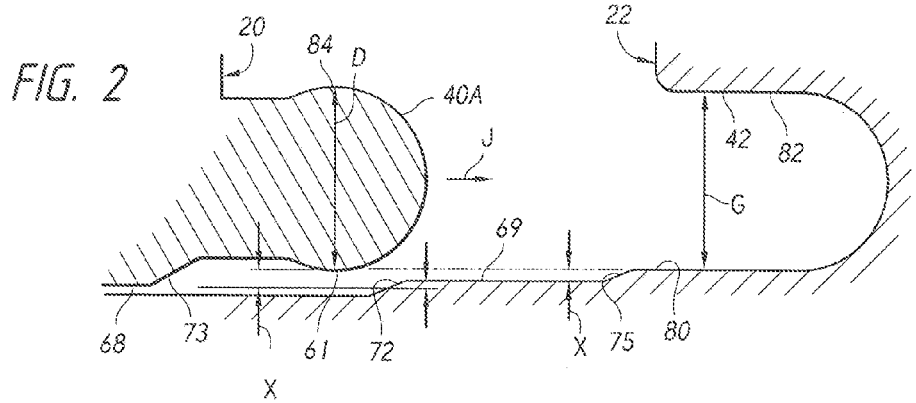
FIGS. 2-5 are sectional views of a portion of the pipeline of FIG. 1, showing how a nib is aligned with a groove during mating of pipe sections.
Figure 3:
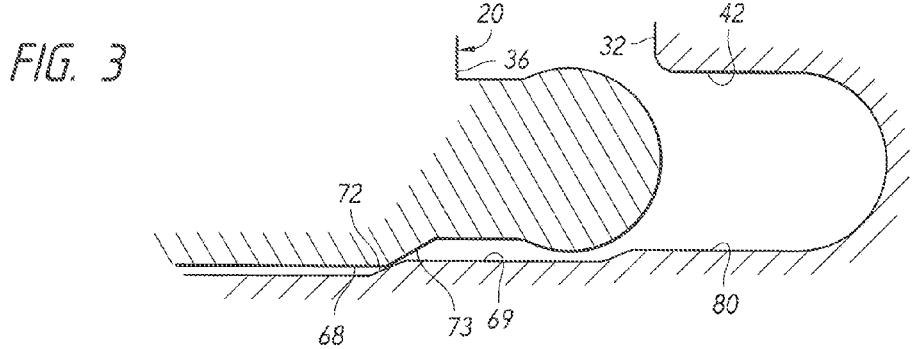
Figure 4:
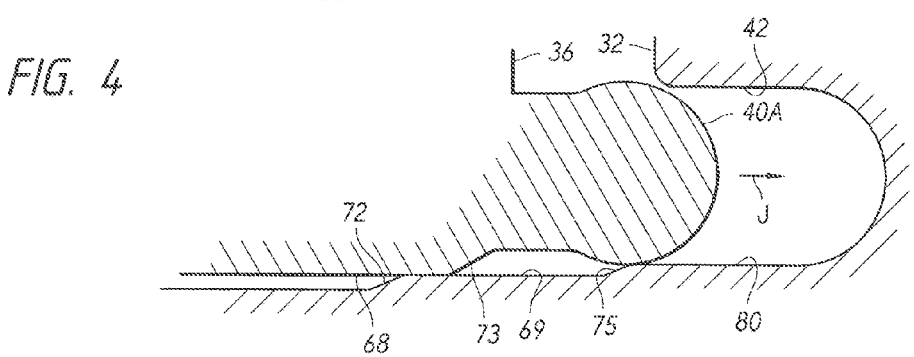

When using a second procedure that involves using "concentric threads", the pipe sections are inserted into one another, advancing one end in direction J (FIG. 2). The make-up of the tapered concentric vs. helical connector is largely the same, however with the concentric thread the radial thread height is smaller than the helical thread and thus the threads are not the first interference contact between the pin 22 and box 20. The first interference contact between the pin 22 and box 20 would be between the taper at 72 (FIG. 3) of surface 69 with the taper 73. The surfaces 68 and 69 are forced onto each other by applying external axial forces. The sections now slide further onto each other and the conical threads begin to make contact.

Conical threads have a unique arrangement of wide and narrow threads that do not engage until they are at their made up position (their fully mated position). A considerable force would be required to advance the threads at 24, 26 and to advance interference surfaces such as 68, 69 at both ends of the sections over one another. Additionally the nibs must be forced into their grooves while the conical threads move to their final locked engagement. When the threads finally mate the axial abutment surfaces will preload against the opposing thread slopes. When using a concentric thread arrangement it is possible to significantly reduce the axial force required to overcome the radial interference between threads by injecting pressurized fluid between the inner and outer pipe sections once the interferences between surface 68, 69 allow for pressurization. When the nibs 40 finally start to enter the grooves 42 this pressure can be increased to effectively force the threads over one another.

Figure 5:
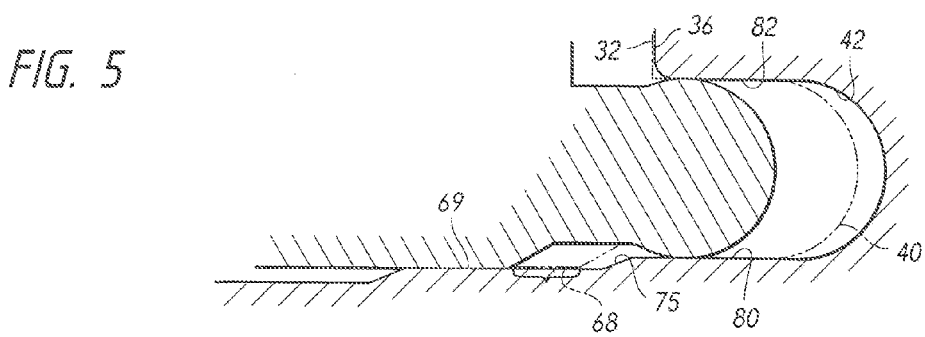

When installing the nib by sliding it in direction J (FIG. 2). It is desirable that the nib enters the groove with good alignment between them. The radial dimensions of the nib and mating groove are machined so they will become aligned during make-up when deflected by the interference surfaces such as 68, 69 (FIG. 1). The nib of box 20 will therefore deflect outward during make-up while the nib of the pin 22 will deflect inward. Applicant constructs a guide wall 69 (FIG. 2) with tapers at 72 and 75 that deflect the nib surface 68 radially outward until the nib 40A enters the deflected groove 42 (FIG. 5). When the nib enters the groove, the walls of the groove and nib deflect and compress the nib until the nib presses against both the radially inner side 80 and radially outer side 82 of the groove.

The first nib 40A (FIG. 1) and the corresponding pipe end at 68 (FIG. 1) lie closer to the outside 14a than the inside of the pipe inside the right side groove 42 the pipe end thickness of part 90 is T, where T is at least 1.5 times, and usually two times the distance R. R is the pipe end thickness of part 92 outside the right side groove 42. The nib ends of the pipe ends are always thinner than the groove ends. When they are forced to interfere by the radial interference sections 68, 69, 67, 66, the deformation or strain will always be larger on the thin end, and therefor the nibs always deform more than the groove walls. Due to this, the groove wall is deflected by much less than half the radial deflection of the nib.

In the initial nib position, shown in FIG. 2, before the nib 40A is deflected radially outward and the groove wall (82) is deflected inward, axial movement of the nib 40A would move the nib so its outer surface 84 would not firmly contact the groove outer surface 82. Only when the nib 40A is deflected radially outward and groove inward, by the inclined surfaces 72, 75 will the nib 40A contact the groove outer surface 82.

The nib 40B and groove 42 at the second end 56 of the pipe connection 51 are virtually mirror images of the construction at the first end 53. That is, at the second end 53 the nib 40B lies on the inner pipe end 22 which is of smaller radial thickness than the outer pipe end 20. The nib is deflected radially inward into the groove.

Thus, the invention provides a pipeline with threadably connected ends, that avoids extra pipe wall thickness and that allows the pipe ends to be joined in a good fluid tight seal. The pipe ends have pipe threads that join the two pipe ends, the pipe ends have engaging racial and axial abutments, and the pipe ends have nibs that enter grooves, when full assembly is reached. The tapered threads that join the pipe ends are of short length, which is made possible by the radial and axial abutment surfaces at axially opposite ends, thereby freeing the threads of considerable bending loads. By minimising the thread tapered length, applicant minimizes the maximum pipe wall thickness. Depending on which end of the pipe section, each nib and groove has a larger or smaller initial diameter (from the pipeline axes) than that of their final made-up diameter. The pipe end from which the nib projects, has guiding walls that deflect the nib so it enters the groove with a gentle deflection.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A pipe assembly that includes first and second pipe sections extending along a pipe axis (16) and having pipe ends, including a first pipe end (20) that surrounds a second pipe end (22), and wherein said second pipe end has a first axially-extending groove (42) and said first pipe end has a first nib (40A) that projects axially into said groove with an interference fit, wherein said groove is spaced a distance R from a radially outer surface (14a) of said second pipe end (22), and said groove is spaced a distance T from the radially inner surface of said second pipe end, where said distance T is greater than said distance R; wherein:

said first pipe end has an inclined wall (73) axially displaced from the first nib (40A) and said second pipe end has an inclined wall (72) axially displaced from the groove that are configured to cause said nib to move radially outward into alignment with said groove when said pipe sections are axially moved together during assembly of said pipe assembly and the inclined wall (73) of said first pipe end slides over the inclined wall (72) of said second pipe end, whereby to minimize strain in said pipe sections.

2. The pipe assembly described in claim 1 wherein:

said first groove has a radially outer groove wall (82) which has been radially deflected by less than half the radially outward deflection of said nib produced by said inclined walls (72, 73, 75).

* * * * *